(12) United States Patent
Hall

(10) Patent No.: US 6,600,586 B1
(45) Date of Patent: Jul. 29, 2003

(54) NORMALIZATION METHOD FOR ACQUIRING INTERFEROMETER PHASE SHIFT FROM FREQUENCY DIVISION MULTIPLEXED FIBER OPTIC SENSOR ARRAYS

(75) Inventor: David B. Hall, La Crescenta, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/309,247

(22) Filed: May 10, 1999

(51) Int. Cl.[7] .............................................. H04B 10/06
(52) U.S. Cl. ........................ 359/193; 359/110; 359/173; 359/123; 359/138
(58) Field of Search ................................ 359/110, 193, 359/123, 138, 173

(56) References Cited

U.S. PATENT DOCUMENTS

| | | | | |
|---|---|---|---|---|
| 5,923,030 A | * | 7/1999 | Assard et al. | |
| 5,995,207 A | * | 11/1999 | Hall et al. | |
| 6,008,900 A | * | 12/1999 | Green et al. | |
| 6,154,308 A | * | 11/2000 | Hall | |

* cited by examiner

Primary Examiner—Leslie Pascal
Assistant Examiner—Dzung Tran
(74) Attorney, Agent, or Firm—Lynn & Lynn

(57) ABSTRACT

An optical phase transient is added to the optical signal input to an interferometer sensor array in addition to a CW phase generated carrier used for acquisition of the interferometer phase shift. Detection of an error signal associated with the transient is used to adjust the modulation depth of the CW phase generated carrier to a null the error signal so that there is a known ratio between the coefficients of the sine and cosine terms in the interferometer output signal to allow for normalization.

4 Claims, 2 Drawing Sheets

NORMALIZATION METHOD FOR ACQUIRING INTERFEROMETER PHASE SHIFT FROM FREQUENCY DIVISION MULTIPLEXED FIBER OPTIC SENSOR ARRAYS

BACKGROUND OF THE INVENTION

This invention relates generally to signal processing techniques for fiber optic interferometric sensor systems. This invention relates particularly to processing signals indicative of a phase shift in an optical signal in frequency-division-multiplexed (FDM) fiber optic interferometric sensor systems. Still more particularly, this invention relates to processing signals proportional to the sine and cosine of the phase shift in an fiber optic interferometric sensor system to determine the magnitude of the phase shift.

Common to all demodulation methods for fiber optic interferometric sensor arrays is the acquisition of an in-phase term proportional to the cosine of the interferometer phase shift and a quadrature term proportional to the sine of the interferometer phase shift. If the amplitudes of the two terms are equal, the phase shift is the arc tangent of the ratio of the quadrature term over the in-phase term. In general, the peak-to-peak amplitudes of the two terms are not equal to one another. They can vary with time depending on the noisiness of the sensor and fiber optic transmission line environments. The phenomenon of signal fading is due to changing states of polarization of the light within the fiber.

Successful implementation of the arctangent operation requires that the coefficients of the sine and cosine terms be known so that normalized terms with equal coefficients can be generated. Observation of the phase shift spinning over many cycles of $2\pi$ arc radians is required to obtain peak values of the quadrature and in-phase terms that in the limit of many samples approach the coefficients of the sine and cosine terms.

The ratio of the peak-to-peak amplitudes of the two terms slowly drifts over time whether or not the separate amplitudes vary rapidly. This ratio can be tracked and measured when the interferometer phase shift goes through a number of cycles. Once the ratio is used to normalize or set the in-phase and quadrature peak-to-peak ratios equal to one another, the arc tangent routine is used to obtain the interferometer phase shift.

There are severe drawbacks to peak detection of the quadrature term, Q and the in-phase term, I. Observation of many samples is required to make the method work with reasonable accuracy. A sensor in a relatively quiet environment has to be observed for an excessively long time to gather a sufficient number of samples. In the limit in which peak-to-peak phase excursions are less than $\pi$ radians over the measurement time, the method fails completely.

Calibration techniques inducing shifts in the optical frequency of the light can be implemented to overcome these difficulties and force the phase shift to spin through a number of cycles of $2\pi$ radians. However, data is not acquired during a relatively long time that might last more than one second.

SUMMARY OF THE INVENTION

The present invention provides a method for normalizing the quadrature signals output by an FDM interferometric sensor array by adding an optical phase transient on the optical signal input to the sensor array in addition to the CW phase generated carrier used for the acquisition of the interferometer phase shift. The duration of the optical phase transient is of the order of one hundred microseconds and its amplitude is of the order of $2\pi$ radians.

Detection of an error signal associated with the transient is used to adjust the modulation depth of the CW phase generated carrier to one fixed value. A fixed value of the modulation depth produces one known ratio between the coefficients of the sine and cosine terms to allow for normalization.

The method according to the present invention for processing signals output from a fiber optic interferometric sensor array comprises the steps of applying to the sensor array a phase-generated carrier modulated optical signal at a modulation frequency f and modulating optical signals input to the sensor to produce an optical phase transient in optical signal in the sensor. An error signal associated with the transient is detected. The sensor output at frequency 2f is detected to determine the in-phase signal I. The sensor output at frequency f is detected to determine the quadrature signal Q. A normalization factor is then determined by calculating the ratio of the sensor output detected at frequency 2f to the sensor output detected at frequency f when the optical signal input to the array is modulated at a modulation depth that nulls the error signal. When the error signal is nulled, there is a fixed ratio between the signals Q and I.

The step of detecting the error signal includes the step of low pass filtering the sensor output to eliminate components having frequency greater than or equal to the modulation frequency f.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Figure 1:
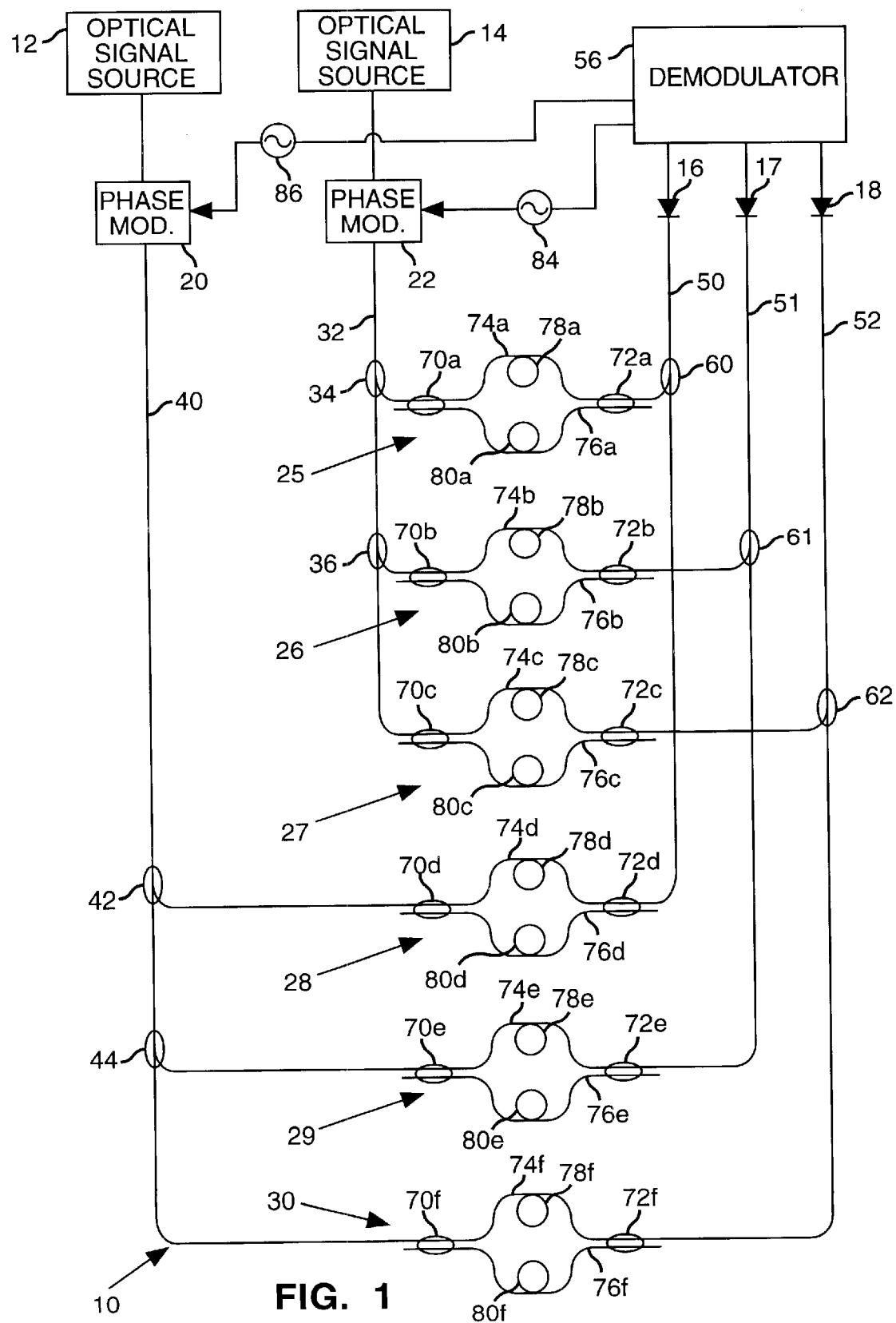
FIG. 1 illustrates an embodiment of a fiber optic sensor array with which the normalization method according to the present invention may be used.

FIG. 1 illustrates an exemplary sensor array architecture with which the signal processing method of the present invention may be used. The invention is not limited to use with this architecture. The invention may be used with any sensor system that provides two output signals that are in quadrature.

FIG. 1 illustrates an FDM architecture 10 that includes a pair of lasers 12 and 14 and three polarization diversity detectors 16–18. The lasers 12 and 14 have corresponding phase modulators 20 and 22. The phase modulators 20 and 22 have phase generated carrier frequencies $f_1$ and $f_2$.

The array 10 includes a plurality of Mach-Zehnder interferometer sensors 25–30. The Mach-Zehnder interferometer sensors 25–30 comprise an example of a sensor array with which the present invention can be used. The Mach-Zehnder interferometers 25–27 receive optical signals from the laser 14 via an optical fiber 32. Optical couplers 34 and 36 couple the optical signals from the optical fiber 32 to the Mach-Zehnder interferometers 25 and 26. The Mach-Zehnder interferometer sensors 28–30 receive optical signals from the laser 12 via an optical fiber 40. Optical couplers 42 and 44 couple the optical signals from the optical fiber 40 into the Mach-Zehnder interferometer sensors 28 and 29.

The Mach-Zehnder interferometer sensors 28–30 provide output signals to optical fibers 50–52, respectively. The optical fibers 50–52 are arranged to provide optical signals to the detectors 16–18, respectively. The detectors 16–18 are connected to a demodulator 56. The Mach-Zehnder interferometer sensors 25–27 provide output signals to optical couplers 60–62, respectively. The optical couplers 60–62 couple the output signals from the Mach-Zehnder interferometer sensors 25–27 into the optical fibers 50–52, respectively, so that these output signals are also input to the detectors 16–18, respectively.

The Mach-Zehnder interferometer sensors 25–30 may be substantially identical. Therefore, only the Mach-Zehnder interferometer sensor 25 is described in detail. The reference numerals for components of the Mach-Zehnder interferometer sensor 25 end with the letter "a." The remaining Mach-Zehnder interferometer sensors 26–30 have reference numerals that end with the letters b–f, respectively.

The Mach-Zehnder interferometer sensor 25 includes a pair of optical couplers 70a and 72a each arranged to couple light between a pair of optical fibers 74a and 76a. The optical fibers 74a and 76a include portions wound around corresponding mandrels 78a and 80a, respectively. The coupler 34 couples light from the optical fiber 32 into the optical fiber 74a. The coupler 70a divides the light between the optical fibers 74a and 76a. The coupler 72a combines the light that has propagated in the optical fibers 74a and 76a. The combined light beams are then input to the fiber 50 via the coupler 60. The combined light beams produce an interference pattern that indicates the phase difference between light guided by the optical fibers 74a and 76a between the two couplers 70a and 72a. The phase difference can be used to monitor acoustic pressure, for example, where each sensor is located.

The demodulator 56 receives electrical signals from the photodetectors 16–18 and then produces electrical signals that indicate the two terms Q and I that are processed to determine the phase shift for each of the sensors 25–30.

Figure 2:
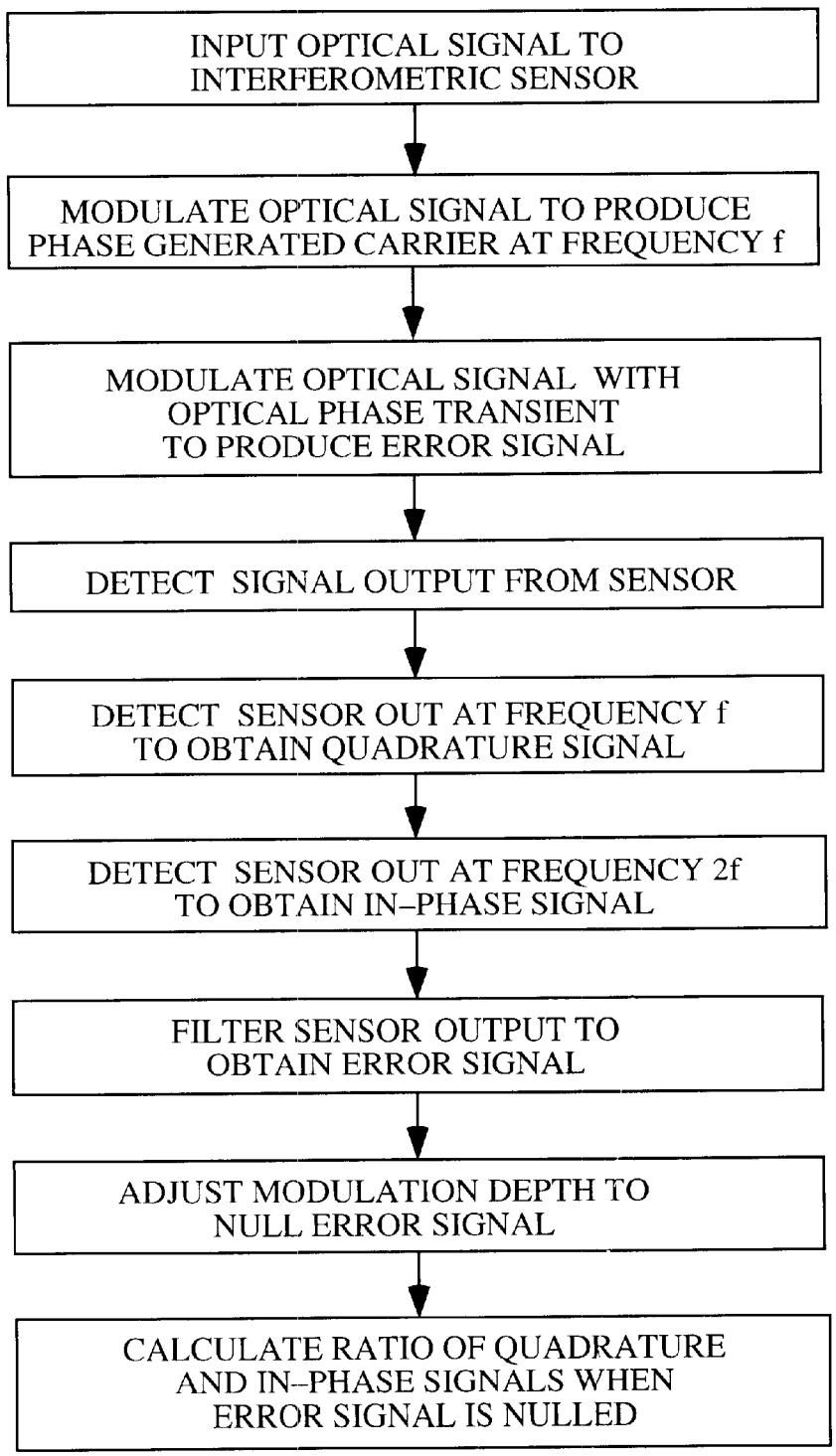
FIG. 2 is a flow chart of the normalization method according to the invention.

A pair of voltage sources 84 and 86 are connected to the phase modulators 22 and 20, respectively. Voltage sources 84 and 86 are connected to demodulator 56 via corresponding feedback loops. Using the feedback, the voltage applied to the phase modulator 22 by the voltage source 84 is adjusted using the algorithm described below and illustrated in the flow chart of FIG. 2 to control the modulation depth of the phase modulator 22 such that the ratio Q/I is 1.0 for one selected sensor, for example, the sensor 25. The voltage applied to the phase modulator 20 by the voltage source 86 is similarly adjusted to control the modulation depth of the phase modulator 20 such that the ratio Q/I is 1.0 for another selected sensor, for example, the sensor 28. If the other sensors 26, 27, 29 and 30 are similar to the sensors 25 and 28, then adjusting the phase modulator voltages to normalize the signal terms Q and I for the sensors 25 and 28 will ordinarily cause the signal terms Q and I from all sensors in the array to be approximately normalized. The signal terms Q and I for the remaining sensors in the array are then completely normalized using the algorithm illustrated in the flow chart of FIG. 2.

There are several techniques for obtaining electrical signals that indicate the terms Q and I that are used to determine the phase shift for each sensor in a fiber optic sensor array. One suitable technique involves sinusoidally modulating or dithering the optical signal output by the optical signal source. The terms Q and I may then be determined by synchronous detection of an odd harmonic and an even harmonic of the modulation or dither frequency. Modulation of the optical signal may be accomplished by modulating the current drive to a semiconductor laser. Another technique involves external phase modulation of the laser output. External phase modulation is preferred when low noise is a significant consideration. In a mismatched path fiber interferometer, the optical frequency modulation of the source light becomes a "phase-generated carrier" modulation that the optical receiver converts into an electrical signal.

This invention is a method for normalizing signal terms Q and I by the addition from time to time of an optical phase transient on the optical signal in addition to the CW phase generated carrier used for the acquisition of the interferometer phase shift in FDM systems. The duration of the optical phase transient is of the order of one hundred microseconds and its amplitude is of the order of $2\pi$ radians.

Detection of an error signal associated with the transient is used to adjust the modulation depth of the CW phase generated carrier to one fixed value. A fixed value of the modulation depth produces one known ratio between the coefficients of the sine and cosine terms to allow for normalization.

The raw signal detected at the output of a fiber optic Mach Zehnder or Michelson interferometer is given by $$S(t)=A(t)+B(t)\cos[\phi(t)+\theta(t)+\epsilon(t)], \qquad (1)$$

where A(t) is the average signal, B(t) is the interference signal coefficient, and $\phi(t)$ is the environmental phase shift to be measured. The remaining terms are $\theta(t)$, the CW phase generated carrier, and $\epsilon(t)$, the optical phase transient. The phase generated carrier and the optical phase transient can be produced either by frequency modulation of the laser source or by external phase modulation.

An expansion of Equation (1) gives $$S(t)=A(t)+B(t)\cos\{\phi(t)+\epsilon(t)\}\cos\theta(t)-B(t)\sin\{(\phi(t)+\epsilon(t)\}\sin\theta(t) \quad (2)$$

where $$\theta(t)=\theta\sin[2\pi ft] \qquad (3)$$

with zero-to-peak modulation depth $\theta$ and modulation frequency f.

The functions A(t), B(t), $\phi$(t), and $\epsilon$(t) are slowly time varying as compared to the function $\theta$(t). In other words, the phase generated carrier frequency f is much higher than any frequencies associated with A(t), B(t), $\phi$(t), and $\epsilon$(t). Bessel function expansions to second order give $$\cos\theta(t)=J_0(\theta)+2J_2(\theta)\cos[4\pi ft] \qquad (4)$$

and $$\sin\theta(t)=2J_1(\theta)\sin[2\pi ft]. \qquad (5)$$

Substitution of Equations (4) and (5) into Equation (2) yields the following terms.

$$S_0(t)=A(t)+B(t)J_0(\theta)\cos\{\phi(t)+\epsilon(t)\}; \qquad (6)$$

$$S_1(t)=-2B(t)J_1(\theta)\sin\{\phi(t(t)+\epsilon(t)\}\sin[2\pi ft]; \qquad (7)$$

and $$S_2(t)=2B(t)J_2(\theta)\cos\{\phi(t)+\epsilon(t)\}\cos[4\pi t f]. \qquad (8)$$

$S_0(t)$ is proportional to $J_0(\theta)$, which is the DC term from the phase generated carrier $\theta(t)$ at modulation frequency f. When the modulation depth $\theta$ equals 2.405 radians, $J_0(\theta)$ is zero and $S_0(t)$ has a null value.

$S_0(t)$ can be considered as an error signal. Detecting $S_0(t)$ and nulling it by forcing the modulation depth $\theta$ to 2.405 radians, the ratio of $J_0(\theta)$ to $J_2(\theta)$ is fixed at 1.2. In other words, the coefficient of the sine term detected synchronously at the modulation frequency f is 1.2 times the coefficient of the cosine term detected at frequency 2f. The ratio 1.2 is used for subsequent normalization.

Figure 3:
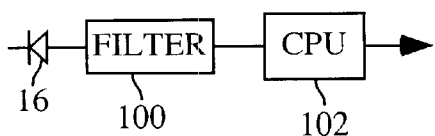
FIG. 3 illustrates features of a demodulator that may be included in the apparatus of FIG. 1.

Detection of $S_0(t)$ requires low pass filtering of the raw signal S(t) so that $S_1(t)$ at frequency f and all higher frequency terms are eliminated. FIG. 3 illustrates such a filter 100 connected to receive an electrical signal output from the polarization diversity detector 16. The filtered signal is input to a CPU 102 that is arranged to perform calculations described herein. The polarization diversity detectors 17 and 18 are connected to corresponding low pass filters (not shown) that are in turn connected to the CPU. In a measurement interval of the appropriate length very much longer than the period 1/f associated with the phase generated carrier, the slowly varying parameters A(t) and B(t) in Eq. (6) for $S_0(t)$ are essentially constant. During this time in which a thousand or more raw data samples can be taken, an optical phase transient $\epsilon(t)$ is introduced. With a peak amplitude of $2\pi$ radians, the difference between the maximum value of $S_0(t)$ and the minimum value of $S_0(t)$ is an error signal $$E(t)=\text{Max}[S_0(t)]-\text{Min}[S_0(t)]=2BJ_0(\theta). \tag{9}$$

For smaller values of $\epsilon(t)$, E(t) is smaller and more variable over repeated intervals. As seen from Eq. (6), when an acoustic tone producing phase shift $\phi(t)$ is of sufficient amplitude and high enough frequency, optical phase transient $\epsilon(t)$ is not needed to generate E(t). The proportionality with $J_0(\theta)$ always holds. Therefore, when the $J_0(\theta)$ term is minimized, there is a fixed relationship between the in-phase and quadrature terms of the signal output from each of the interferometer sensors 25–30. It should be noted that in particular, when $\theta$ is 2.405 radians, there is a null in the error signal E(t) because $J_0(\theta)$ goes to zero. The depth of the null is a function of how well the raw signal has been filtered to eliminate extraneous signals not dependent on $J_0(\theta)$.

Math CAD Simulation

Simulations on Math Cad have been performed for the error signal with the raw signal composed of the sum of the outputs of four sensors interrogated at four different carrier frequencies ranging between 3 and 6 megahertz. Each sensor receives light from a separate laser. The raw signal has been filtered with a cutoff at 50 kilohertz to block the carrier frequencies. Acoustic tones at one kilohertz produce phase shifts $\phi(t)$ at the four sensors with zero to peak amplitudes ranging from zero to 20 radians. 4096 samples at 25.6 megasamples per second are taken for a total interrogation time of 160 microseconds.

The optical phase transient $\epsilon(t)$ shaped as a hyperbolic secant is added to one of the four sensor outputs. It has a peak amplitude of $2\pi$ radians and a full width at half maximum of 30 microseconds. Values of the error signal are taken with all four sensors at $\theta=2.3, 2.4$, and 2.5 radians. The minimum signal always occurs at 2.4 radians as it should. In going from 2.4 to 2.3 or 2.5 radians, the error signal increases by a factor of 10 to 30. The analysis is also done in a statistical fashion with all four sensors at $\theta=2.3, 2.4$, and 2.5 radians $\pm 5\%$ indicating that there is some variation from sensor to sensor in the build process. In this case, in going from 2.4 to 2.3 or 2.5 radians, the error signal increases by a factor of 2 to 30.

In another simulation the hyperbolic secant function for $\epsilon(t)$ is replaced with an arctangent that shifts the phase from $-\pi$ to $+\pi$ radians with a 10 to 90% rise time of 20 microseconds. Similar results are obtained in this case in going from 2.4 to 2.5 or 2.3 radians. Repetitive measurements yield averages that can be used to adjust $\theta$ for a minimum error signal. For an external phase modulator this means the application of two or more somewhat different voltage amplitudes to determine the direction to go in for the appropriate voltage corresponding to the minimum error signal.

The optical phase transient is too slow to apply to an external phase modulator. It needs to be implemented at the laser. The PZT crystal for a laser that is suitable as the optical source for the present invention can be pulsed to obtain an optical frequency shift of 100 MHz in a period of 20 microseconds. This corresponds to the phase transient of the duration and magnitude described above for a two meter mismatch interferometer. Such results are described in a paper by Kane and Cheng in Optics Letters, Volume 13, November 1988, p. 970.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for processing signals output from an array of fiber optic interferometric sensors, comprising the steps of:

applying to the array a phase-generated carrier modulated optical signal at a modulation frequency f;

modulating the optical signal input to the array to produce an optical phase transient in optical signal in the sensors;

detecting an error signal output from the array associated with the optical phase transient;

detecting the array output synchronously with the error signal at frequency f;

adjusting the modulation of the phase-generated carrier to null the error signal such that there is a fixed ratio between a quadrature component in the sensor output signal dependent upon the sine of the phase shift and an in-phase component in the error signal dependent upon the cosine of the phase shift.

2. The method of claim 1 wherein detecting the error signal comprises the step of low pass filtering the sensor output to eliminate components having frequency greater than the modulation frequency f.

3. A fiber optic interferometric sensor system that includes an array of fiber optic interferometer sensors; comprising:

apparatus for applying to the array a phase-generated carrier modulated optical signal at a modulation frequency f;

modulating apparatus arranged for modulating optical signals applied to the array to produce an optical phase transient in optical signal in the sensors;

a detector arranged for detecting an error signal associated with the transient;

apparatus for detecting the array output at frequency f to obtain a quadrature signal Q;

apparatus for determining a normalization factor by calculating the ratio of the quadrature signal Q to the in-phase signal I when the error signal has its minimum value, thereby setting a fixed ratio between a term in the sensor output signal dependent upon the sine of the phase shift and a term in the error signal dependent upon the cosine of the phase shift.

4. The system of claim 3 wherein the apparatus for detecting the error signal includes a low pass filter to eliminate components in the sensor output having frequency greater than the modulation frequency f.

* * * * *